UNITED STATES PATENT OFFICE.

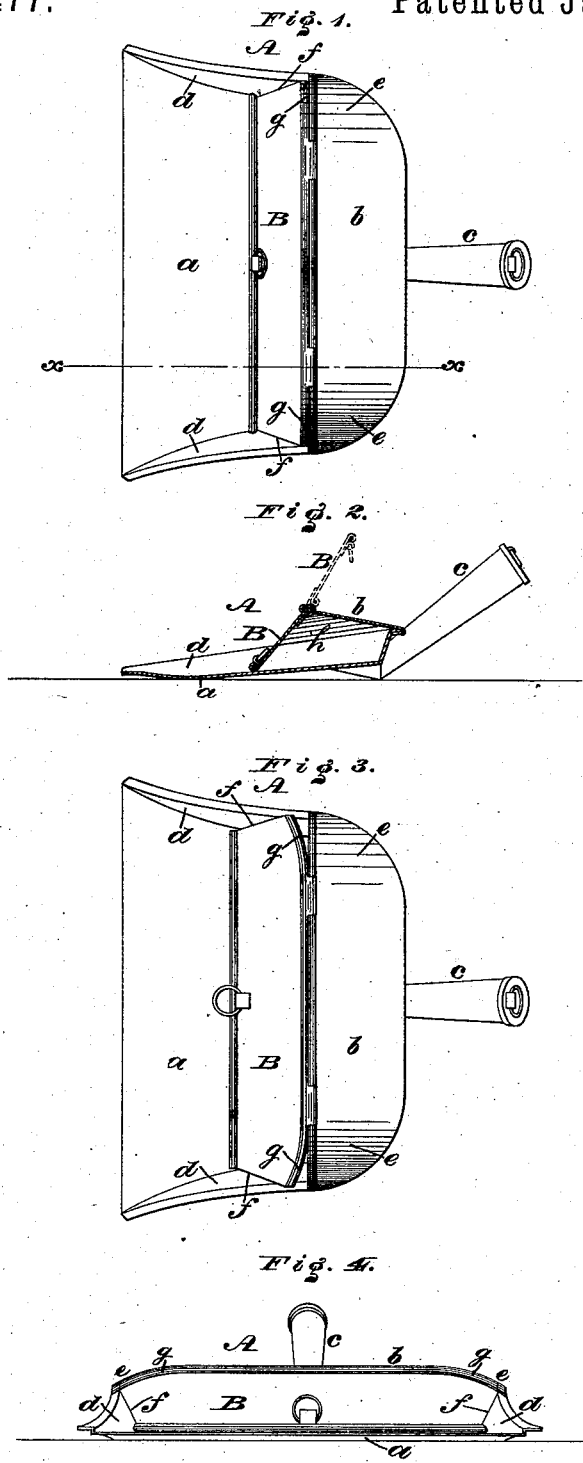

JAMES I. FLANAGEN, OF PHILADELPHIA, PENNSYLVANIA.

DUST-PAN.

SPECIFICATION forming part of Letters Patent No. 292,477, dated January 29, 1884.

Application filed October 6, 1883. (No model.)

*To all whom it may concern:*

Be it known that I, JAMES I. FLANAGEN, a citizen of the United States, residing in the city and county of Philadelphia, State of Pennsylvania, have invented a new and useful Improvement in Dust-Pans, which improvement is fully set forth in the following specification and accompanying drawings, in which—

Figure 1 is a top or plan view of a dust-pan embodying my invention. Fig. 2 is a section in line $x\ x$, Fig. 1. Fig. 3 is a top view, the lid of the pan being partly open. Fig. 4 is a front view, the lid being closed.

Similar letters of reference indicate corresponding parts in the several figures.

My invention consists in attaching a lid to the hood of a dust-pan, thus closing the chamber which is formed by said hood and the bottom of the pan, causing dust, &c., to be readily retained therein, the other parts of the pan being generally of usual construction. As the lid adds weight to the hood, the latter is made of arch form, so as to possess additional strength for sustaining the lid when raised, and thus superimposed upon the hood.

Referring to the drawings, A represents a dust-pan, formed of a bottom, $a$, arched hood $b$, and handle, $c$, these parts being of well-known form and construction.

B represents a lid, which is hinged to the front end of the hood $b$, and adapted to close on the bottom $a$ and side pieces, $d$, thereof, it being seen that said lid, when closed, occupies a diagonal position, or is set out at its lower end so as to be prevented from being pushed inwardly to an injurious extent, it also being seen that the arched form of the hood is employed, owing to the additional weight imposed thereon by the lid, especially when raised, a stiffened hood thus being requisite.

In order to accommodate the lid to the flaring side pieces, $d$, of the pan and rounded side portions, $e$, of the hood, the sides of the lid are cut away diagonally, as at $f$, and the ends of the lid on the inner or hinged portion thereof are cut away and rounded, as at $g$, as most plainly shown in Fig. 3, by which provision is made for causing the lid to abut flush against the side pieces of the bottom and the front edge of the hood, whereby, after the lid is raised, the dust swept into the pan, and the chamber $h$ beneath the hood and the lid again closed, the dust is retained within said chamber without liability to escape at the joints of the lid, especially while the pan is being carried to the place where the dust and dirt are to be discharged, or elsewhere.

It will also be noticed that the chamber $h$ is not reduced. On the contrary, the arrangement of the lid increases the size of the space within which the dust, &c., may be inclosed.

Having thus described my invention, what I claim as new, and desire to secure by Letters Patent, is—

1. A dust-pan having a hood of arched form and a lid hinged thereto, substantially as and for the purpose set forth.

2. A dust-pan having an arched hood and a lid hinged to the front of said hood, cut away and rounded, as at $g$, substantially as and for the purpose set forth.

3. A dust-pan having an arched hood and a lid hinged to said hood, cut away and rounded, as at $g$, and cut away at the outer sides, as at $f$, substantially as and for the purpose set forth.

JAMES I. FLANAGEN.

Witnesses:
JOHN A. WIEDERSHEIM,
A. P. GRANT.